(12) United States Patent
Shan et al.

(10) Patent No.: US 7,985,400 B2
(45) Date of Patent: Jul. 26, 2011

(54) METHOD FOR MAKING MESOPOROUS OR COMBINED MESOPOROUS AND MICROPOROUS INORGANIC OXIDES

(75) Inventors: Zhiping Shan, Bloomfield, NJ (US); Xintao Gao, Edison, NJ (US); Chuen Y. Yeh, Edison, NJ (US); Philip J. Angevine, Woodbury, NJ (US); Martin Kraus, Jersey City, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 1038 days.

(21) Appl. No.: 10/764,797

(22) Filed: Jan. 26, 2004

(65) Prior Publication Data

US 2005/0164870 A1 Jul. 28, 2005

(51) Int. Cl.
*C01B 33/36* (2006.01)
(52) U.S. Cl. ......... 423/702; 423/705; 423/709; 423/710
(58) Field of Classification Search ............... 423/702, 423/705, 709, 710
See application file for complete search history.

(56) References Cited

U.S. PATENT DOCUMENTS

| | | | | |
|---|---|---|---|---|
| 5,250,277 A * | 10/1993 | Kresge et al. | ............... | 423/329.1 |
| 5,273,736 A * | 12/1993 | Nakagawa | ................... | 423/702 |
| 5,320,822 A * | 6/1994 | Ozin et al. | ..................... | 423/700 |
| 5,418,298 A * | 5/1995 | Laine et al. | ................... | 525/389 |
| 6,358,486 B1 * | 3/2002 | Shan et al. | ..................... | 423/326 |
| 6,410,473 B1 * | 6/2002 | Pinnavaia et al. | ............... | 502/74 |
| 6,660,682 B2 * | 12/2003 | Cao et al. | ....................... | 502/214 |
| 6,814,950 B1 * | 11/2004 | Shan et al. | ..................... | 423/326 |
| 6,906,208 B2 * | 6/2005 | Shan et al. | ..................... | 549/533 |
| 7,084,087 B2 * | 8/2006 | Shan et al. | ..................... | 502/64 |
| 2002/0074263 A1 * | 6/2002 | Shan et al. | ..................... | 208/134 |
| 2002/0111522 A1 * | 8/2002 | Overbeek et al. | ............ | 585/467 |
| 2003/0147805 A1 | 8/2003 | Koegler et al. | | |
| 2005/0159297 A1 * | 7/2005 | Lin et al. | ......................... | 502/62 |

FOREIGN PATENT DOCUMENTS

| | | |
|---|---|---|
| WO | WO 00/15551 A | 3/2000 |
| WO | WO 2004/026473 | 4/2004 |
| WO | WO 2004/052537 | 6/2004 |

OTHER PUBLICATIONS

International Search Report and Written Opinion of PCT/US2005/002209 filed Jan. 24, 2005.

* cited by examiner

*Primary Examiner* — Kiley Stoner
*Assistant Examiner* — Paul A Wartalowicz
(74) *Attorney, Agent, or Firm* — Alix, Yale & Ristas, LLP

(57) ABSTRACT

A method for making a mesoporous or combined mesoporous/microporous inorganic oxide includes reacting a source of inorganic oxide with a complexing agent at a complexation temperature to provide a complex; decomposing the complex to provide a porous material precursor having an inorganic oxide framework containing at least some organic pore-forming agent; and removing the organic pore forming agent from the inorganic oxide framework by solvent extraction and/or calcination.

17 Claims, No Drawings

US 7,985,400 B2

METHOD FOR MAKING MESOPOROUS OR COMBINED MESOPOROUS AND MICROPOROUS INORGANIC OXIDES

BACKGROUND

1. Field of the Invention

The present invention relates to an improved method of making inorganic porous oxides which can be used as catalysts, catalyst supports, or adsorbents.

2. Background of the Art

Various methods are known for making inorganic oxides containing mesopores or micropores. Typically, micropores are defined as pores having a diameter less than 2 nm, while mesopores are defined as having pore diameters of from 2 to 50 nm. The inorganic oxides can be used as catalysts, catalyst supports, or adsorbents. Optionally, the inorganic oxide can be combined with zeolites.

U.S. Pat. No. 6,358,486 to Shan et al., which is herein incorporated by reference, discloses a bimodal amorphous inorganic oxide with mesoporosity or combined meso and micro porosity, and a process for preparing the oxide.

U.S. Patent Application Publication U.S. 2002/0074263, which is herein incorporated by reference, discloses a catalytic material which includes a microporous zeolite, such as zeolite beta, zeolite Y or ZSM-5 supported on a mesoporous inorganic oxide such as silica or alumina. Methods for making and using the catalytic material are also described.

While various methods are known for making non-crystalline mesoporous and microporous inorganic oxides, it would be advantageous to use less expensive materials and have a more environmentally compatible process.

SUMMARY

A method for making a mesoporous or combined mesoporous/microporous inorganic oxide is provided herein. The method comprises the steps of: (a) reacting a source of inorganic oxide with at least one complexing agent at a complexation temperature to provide at least one complex; (b) decomposing the complex to provide a porous material precursor having an inorganic oxide framework containing at least some organic pore forming agent; and (c) removing at least a major portion of the organic pore-forming agent from the inorganic oxide framework by solvent extraction and/or calcination.

The method advantageously facilitates both the use of inorganic sources of oxide and recovery of organic pore-forming agents, thereby providing environmental advantages as well as cost savings.

DETAILED DESCRIPTION OF PREFERRED EMBODIMENT(S)

The present invention provides a new, cost-effective process to synthesize non-crystalline mesoporous or combined mesoporous/microporous inorganic oxides for use as catalysts, catalyst supports, adsorbents and molecular sieves. The oxides have three-dimensional randomly interconnected mesopores or combined mesopores and micropores. The oxides or the combination with oxygen of one or more elements selected from groups IVB, VB, VIIB, VIIB, IB, IIB, IIIB, VIII, VA, IVA, IIIA, IIA, and lanthanides. Particular examples of metal elements include Si, Al, Ti, V, Cr, Zn, Fe, Sn, Mo, Ga, Ni, Co, Zr, Cu, Mg, Bi, Nb, Mn, Zr, Sb, La, Ce, Te and W. The oxides may be pure oxides (i.e., containing only one type of metal) or mixed oxides (i.e., containing two or more types of elements). The molar ratio of the different metals in a mixed oxide can range from 0.0001 to about 0.9999.

The oxide composition of the invention shows at least one peak at 0.3-3.5 degrees in 2θ in the X-ray diffraction ("XRD") patterns, which corresponds to a basal spacing between 25 Å and 440 Å. Nitrogen adsorption reveals that it has tunable mesopores ranging in size from about 15 Å to about 300 Å, and surface areas of from about 40 to about 1,250 m$^2$/g and a pore volume of from about 0.3 to about 2.5 cm$^3$/g, depending upon the oxide composition.

The composition of the present invention can include microporous materials, such as zeolites, incorporated into the structure.

The composition can be used as a catalyst or as a part of a catalyst composition. As part of a catalyst the composition of the present invention can be an active component of a catalyst, or it can be a catalyst support. In the case of silica, the composition of the present invention is mainly used as a catalyst support or matrix, which can support precious metals, e.g., Pd, Pt, and Rh, for many applications, e.g., hydrogenation, hydrogenolysis, etc. Depending on the functionality of the incorporated elements, the composition can have weak, medium, or strong acidity. Consequently, it can catalyze cracking, isomerization, alkylation, acylation, polymerization, dehydration, denitrogenation, and desulfurization or organic compounds. The composition can also have redox properties, which can catalyze epoxidation of alkenes (e.g., cyclohexene, ethylene, or propylene), selective oxidation of alkanes (e.g. cyclododecane, cyclohexane), alcohols and amines, hydroxylation of aromatics and ammoxidation of ketones. Addition of metals to this composition offers the capability of hydrocracking, (de)hydrogenation, and desulfurization. In the case of silica-alumina, the composition can be used as an acidic catalyst for cracking, or esterification, but it can also be used a catalyst support/matrix. By incorporating Bi—Mo, Fe—Sb or Mo—V—Nb—Te mixed oxides, the composition can be used as an active catalyst component for selective oxidation of organics. The composition of the invention can be applied as catalysts, co-catalysts (a part of catalysts), catalyst supports, absorbents and molecular sieves.

The method herein includes reacting a source of inorganic oxide with an complexing agent at a complexation temperature. The complexing agent comprises at least one amine, preferably an alkanolamine, which solubilizes the inorganic oxide by forming a complex such as an alkanolamine-inorganic oxide complex. The complexation reaction includes heating a mixture of the amine and inorganic oxide source to a complexation temperature of typically from about 150° C. to about 250° C., preferably from about 180° C. to about 220° C. for a period of time ranging from about 10 minutes to about 48 hours, a pressure of from about 0.1 bar to 2 bars, and under an atmosphere of air or inert gas such as nitrogen or argon. At temperatures above 250° C. the complex formed between the inorganic oxide and the complexing agents described herein begins to decompose as described below. Therefore, in this first step of the inventive method the complexation temperature should not go above 250° C., and preferably should be below 240° C.

In one embodiment of the invention the inorganic oxide source can be an organic compound. The organic groups in the organic sources of inorganic oxide can include, for example, alcoholic carboxylic and/or alkyl groups. Such organic sources include, for example, tetraethyl orthosilicate ("TEOS"), aluminum alkoxides (e.g., aluminum isopropoxide), magnesium alkoxides (e.g., magnesium ethoxide), and like compounds. Also useful as organic sources of inorganic oxides are neutral and mixed neutral/anionic polymetallooxanes such as silatrane, alumatrane, titanatrane, and other such compounds as disclosed in U.S. Pat. Nos. 5,418,298 and 5,216,155 to Laine et al., and patent application WO 98/27010, all of which are herein incorporated by reference.

More preferred as a source of the inorganic oxide are inorganic sources such as hydrated or unhydrated oxides or hydroxides of the desired elements, or salts of the desired elements such as nitrates, carbonates, ammonium salts (e.g., ammonium molybdate, ammonium tungstate, ammonium dichromate), etc. Preferred sources of silicon oxide include silica gel, silica hydrogel, silica aerogel, silica sol, fumed silica, etc. A preferred source of aluminum oxide is aluminum hydroxide, alumina oxide or aluminum salts. Preparation of mesoporous magnesium oxide can employ magnesia, magnesium hydroxide or magnesium salts as a starting source.

Unlike the use of organic sources of inorganic oxide as a starting material, this embodiment of the invention starts with an inorganic source, which is less expensive and easier to handle. The inorganic oxide is converted into an organic complex in situ.

The complexing agent preferably has a boiling point of at least 160° C., preferably at least about 190° C., and is a compound having amino group, preferably any alkanolamine capable of forming a complex with the desired inorganic oxide. Alkanolamines suitable for use in the present invention include, but are not limited to, triethanolamine (TEA), triisopropanolamine, tripropanolamine, tris-hydroxymethyleneaminomethane, N,N-dimethylethanolamine and combinations thereof.

A significant feature of the present invention is that the alkanolamine performs two functions. In the first instance it functions as a complexing agent to solubilize the inorganic oxide. But it also then functions as a pore-forming agent to facilitate the formation of the inorganic oxide into a mesoporous (or mesoporous/microporous) structure.

Optionally, one or more organic solvents are used in conjunction with the alkanolamine complexing agent. Preferred solvents include glycols such as, for example, ethylene glycol (EG), triethylene glycol, tetraethylene glycol, propylene glycol, tripropylene glycol, and tetrapropylene glycol. The organic solvent should have a boiling point of at least about 100° C., but lower than that of the alkanolamine complexing agent. Most preferred solvents are ethylene glycol and propylene glycol.

Optionally, an alkali such as sodium hydroxide, sodium carbonate or potassium hydroxide and potassium carbonate can be added to the mixture described above to accelerate the complexation reaction.

In a second step the complex is decomposed to form a porous material precursor. The decomposition of the complex results in some free pore-forming agent, the molecules of which aggregate into clusters of a particular size. The inorganic species of the selected inorganic oxides then coalesce around the clusters of pore-forming agent to form a porous inorganic oxide framework. The pore size of the final inorganic oxide is determined by the aggregates of pore-forming agent, which are trapped inside the inorganic oxide framework. A inorganic oxide/organic composite (i.e., a porous material precursor) is formed, in which the aggregates of the pore-forming agent homogeneously distribute throughout the inorganic framework. More importantly, these aggregates are well-arranged with a certain spacing unit.

Decomposition of the complex can be accomplished, at least in part, by hydrolysis. In particular, water or an aqueous solution is added to the complex or mixtures obtained in the previous step. The aqueous solutions can be neutral pH, acidic (e.g., a pH below about 6) or basic (e.g., a pH of above about 8). Acidic solutions can be selected from inorganic acids such as nitric acid, hydrochloric acid, or sulfuric acid, or organic acids such as acetic acid, formic acid, or other carboxylic acids. Basic solutions can be selected from inorganic alkalis for example, such as potassium hydroxide, sodium hydroxide, ammonium hydroxide, or sodium carbonate. Suitable organic bases include for example, urea and/or tetraalkyl ammonium hydroxides such as tetraethyl ammonium hydroxide, tetramethyl ammonium hydroxide or tetrapropyl ammonium hydroxide, and/or benzyltrimethylammonium hydroxide, and/or tetrabutylphosphonium hydroxide, and/or dimethyldiethylammonium hydroxide.

Alternatively, the complex can be decomposed by heating to a temperature above 250° C., preferably to a temperature of from 251° C. to about 450° C., more preferably from about 275° C. to about 400° C. for a period of time ranging from about 0.1 hours to about 24 hours, preferably from about 2 hours to about 16 hours. Preferably, decomposition by heating can be performed in conjunction with hydrolysis.

In a next step a major portion of, and preferably substantially all of, the organic pore-forming agent is removed from the pores of the inorganic framework of the porous material precursor. This step can be accomplished by, for example, solvent extraction and/or calcination. Extraction of the pore-forming agent (i.e., the alkanolamine) can be accomplished by immersing the porous material precursor in a suitable solvent such as water, alcohols (e.g., methanol, ethanol, isopropanol, etc.), ethers (e.g., methylethyl ether, diethyl ether, methyl t-butyl ether, etc.), ketones (e.g., acetone, methylethyl ketone, etc.), or esters (ethyl acetate, propyl acetate, butyl acetate, ethyl propionate, ethyl benzoate, etc.), or mixtures thereof. The pore-forming agent can be recovered from this extraction step and recycled, thereby reducing synthesis cost and adverse environmental impact.

Calcination is typically performed by heating the porous material precursor to a temperature above 400° C., preferably from about 401° C. to about 1100° C., more preferably from about 450° C. to about 700° C., for a period of calcination time ranging up to about 48 hours, preferably from about 1 hour to about 48 hours, and more preferably from about 5 to about 20 hours. Preferably, the calcination is performed after solvent extraction, although either the solvent extraction or calcination can be performed alone.

The method of the present invention can be flexibly modified so as to provide control over such features as pore size, pore volume, and surface area in the final product. To achieve pore "tunability" the following procedures can be performed:

After the complexation step, decomposition of the complex can be performed by hydrolysis, for example, by adding water or an aqueous solution to the complexes formed in the first step to provide the porous material precursor.

Next, the porous material precursor can optionally be aged from about 20° C. to about 120° C. for a period of aging time ranging up to about 48 hours. Optionally, the mixture can be autoclaved in a pressurized vessel at a temperature of from about 50° C. to about 120° C. for a period of time up to about 2 days, with or without previous aging at room temperature.

Next, the porous material precursor can be dried to remove most of the volatile compounds (e.g., water, alcohols) by heating to a temperature of from about 60° C. to about 140° C. for a period of time ranging from about 1 hour to 48 hours.

Next, the dried material can be autoclaved at temperature of from about 120° C. to about 200° C. for a period of time ranging from about 1 hour to 96 hours.

Finally the porous material precursor can be treated by solvent extraction and/or calcination at a temperature above 400° C. to remove any organic compounds contained within the pores of the porous material precursor to provide the mesoporous or combined mesoporous/microporous inorganic oxide material.

The composition of the invention can contain one or more types of zeolite. For example, preformed zeolite can be added to the complexes obtained in the first synthesis step of the procedure described above. Addition of the zeolite can be done together with water or aqueous solution, or after the addition of water or aqueous solution. Suitable zeolites for inclusion in the composition of the invention include, but are not limited to, zeolite Y, zeolite X, zeolite L, zeolite A, zeolite beta, mordenite, SSZ-32, ZSM-5, ZSM-11, ZSM-22, ZSM-23, ZSM-48, ZSM-58, MCM-22, MCM-36, PSH-3, silicalite-1 and silicalite-2, and can be selected from among the group types LTL, FAU, MOR, BEA, MFI, MEL, MTW, MWW, DDR, MTT, MFS, FER, and TON.

In addition to using less expensive and more environmentally compatible inorganic oxide starting materials, a second advantage of the method of the present invention is the recovery of the organic pore-forming agent before final calcination. This recovery can be accomplished by (a) extraction using solvents, and/or (b) pre-calcination under nitrogen, argon, or other non-oxidizing gas.

With respect to extraction, suitable solvents are those which can dissolve the organic pore-forming agent without damaging the porous inorganic oxide structure. Such solvents can be selected from water, alcohols, ethers, ketones or esters, or mixtures thereof, as mentioned above. The pore forming agent can be recovered from its solution in the solvent by, for example, distillation.

With respect to pre-calcination heating, a stream of non-oxidizing gas, such as nitrogen or argon, is passed over the porous material precursor which has been heated to a temperature sufficiently high to evaporate and/or decompose the pore-forming agent and for a period of time sufficient to remove most or substantially all of the pore-forming agent from the inorganic oxide structure. Typically, the temperature can range from about 150° C. to about 350° C. The period of heating time can typically range from about 1 hour to about 16 hours. The pore-forming agent can thereafter be recovered by, for example, chilling and condensation.

The following Examples and Comparative Examples are presented for the purpose of illustration. The Examples illustrate features of the invention. The Comparative Examples are for comparison purposes and do not illustrate the invention. Composition percentages and parts are by weight unless otherwise indicated.

COMPARATIVE EXAMPLE A

In this Comparative Example A, Ludox silica sol was used as silica source. First, 92 parts of Ludox HS-40 were mixed with 93 parts of triethanolamine (TEA) and 65 parts of water. After 1 hour stirring, tetraethylammonium hydroxide (TEAOH, 35 wt %) was added into the above mixture until the pH value reached 10. After 2 hours stirring, the whole mixture was transferred into an autoclave and followed with hydrothermal treatment at 180° C. under autogenous pressure for 6 hours. Then the synthesis mixture was dried at 98° C. to remove water to get a thick gel. The dried gel was then transferred into an autoclave to undergo another hydrothermal treatment at 180° C. for 4 hours. Finally, the dried gel was calcined at 600° C. for 10 hours in air with a ramp rate of 1° C./min.

The X-ray diffraction (XRD) pattern of the final product showed an amorphous halo between 20 to 30 degrees in 2θ, indication that the final product did not possess a well-defined structure. Nitrogen adsorption revealed a low surface area of about 200 $m^2/g$ and a broad pore size distribution.

COMPARATIVE EXAMPLE B

In this Comparative Example B waterglass was used as silica source. First, 19 parts of waterglass (~14 wt % NaOH, ~27 wt % $SiO_2$) were mixed with 7 parts of water and then added 25 parts of tetraethylene glycol (TEG). Then the synthesis mixture was dried at 98° C. for 20 hours and calcined at 600° C. for 10 hours with a ramp rate of 1° C./min.

The XRD pattern of the final product showed a crystalline material, sodium silicate. Nitrogen adsorption showed about 25 $m^2/g$ in surface area.

The following examples are successful in terms of mesoporous material preparation using the process of the present invention.

EXAMPLE 1

First, 30 parts of silica gel, 74 parts of triethanolamine (TEA) and 60 parts of ethylene glycol (EG) were loaded into a reactor equipped with a condenser. After the contents of the reactor were mixed well with a mechanical stirrer, the mixture was heated up to 200-210° C. while stirring. This setup removed most of water generated during reaction together with a small portion of EG from the top of the condenser. Meanwhile, most of the EG and TEA remained in the reaction mixture. After about five hours, heating was stopped; and the reaction mixture was collected after cooling down to 55° C. This reaction mixture was slightly brown, denoted as mixture I.

Second, 95 parts of water and 60 parts of aqueous solution of tetraethylammonium hydroxide (TEAOH, 35%) were added into the mixture I while stirring, and no gel formed. Unreacted silica gel particles were filtered out and weighed about 8%. The liquid solution part was dried at 98° C. for 25 hours to solid chunks of dried mixture.

Third, one portion of the dried mixture was calcined at 600° C. for 10 hours in air with a ramp rate of 1° C./min and finally a white powder sample was obtained for analysis.

The XRD pattern of the dried mixture exhibited an intensive reflection at about 1.1 in 2θ, indication the characteristic of mesoporous material. Nitrogen adsorption revealed a surface area of 860 $m^2/g$, a total pore volume of 0.66 $cm^3/g$ and a mean pore diameter of about 3.5 nm.

EXAMPLE 2

This example demonstrates pore "tunability," i.e., the ability to prepare materials with predetermined pore diameters or pore volume by selective variation of the treatment conditions (e.g., autoclave heating time and/or temperature) of the synthesis mixture. The synthesis mixture and procedures are the same as that of Example 1. The dried mixture (obtained by drying at 98° C. for 25 hours) was divided into three (3) portions designated herein as Samples 2-1, 2-2, and 2-3. These three portions were transferred into autoclaves and placed in ovens at 180° C. for different periods of time as shown in Table 1. All porosity was measured by nitrogen adsorption.

TABLE 1

(Porosity of the samples obtained in Example 2)

| Sample | Heating time in autoclaves at 180° C. (hr) | Surface area (m²/g) | Pore volume (cm³/g) | Pore diameter (nm) |
|---|---|---|---|---|
| 2-1 | 4 | 750 | 0.71 | 4.0 |
| 2-2 | 12 | 450 | 0.87 | 15 |
| 2-3 | 42 | 420 | 1.11 | 22 |

As can be seen from Table 1, pore diameter and volume increased with increased heating time.

EXAMPLE 3

This example demonstrates that ail alkali solution is not needed for the hydrolysis of complexes. First, 24 parts of silica gel, 76 parts of TEA and 62 parts of EG were loaded into a reactor equipped with a condenser. The same procedures were followed as described in Example 1. After about 8 hours, heating was stopped and a slight brown, glue-like complex liquid was collected after cooling down to room temperature.

Second, 100 parts of water were added into 125 parts of the complex liquid obtained above under stirring conditions. After one hour stirring, the mixture formed a thick gel; the gel was aged at room temperature for 7 days.

Third, the thick gel was divided into two portions designated herein as Samples 3-1 and 3-2. The two portions were transferred into two autoclaves and heated up to 70° C. for 6 and 11 hours, respectively. Then these two gels were dried at 98° C. for 23 hours. Once again they are loaded into autoclaves and heated up to 180° C. for 2.4 hours. Finally these two portions were calcined at 600° C. in air for 10 hours with a ramp rate of 1° C./min.

The porosity of these four samples is listed Table 2.

TABLE 2

(Porosity of the samples obtained in Example 5)

| Sample | Heating time in autoclaves at 70° C. (hr) | Surface area (m²/g) | Pore volume (cm³/g) | Pore diameter (nm) |
|---|---|---|---|---|
| 3-2 | 6 | 752 | 0.70 | 3.7 |
| 3-3 | 11 | 688 | 0.75 | 4.4 |

EXAMPLE 4

This example demonstrates mesoporous alumina synthesis. First, 150 parts by weight of aluminum hydroxide, 320 parts of TEA and 240 parts of EG were loaded into a reactor equipped with a condenser. The same procedures were followed as described in Example 1. After about 5 hours, heating was stopped; and a slight yellow liquid was collected after cooling down to room temperature.

Second, 25 parts of water were added to 50 parts of the above complex liquid under stirring. After one hour stirring, the mixture formed a thick gel.

Third, the gel was dried at 80° C. for 12 hr, and then transferred into an autoclave and heated up to 180° C. for 3 hours. Finally the gel was calcined at 600° C. in air for 10 hours with a ramp rate of 1° C./min.

Nitrogen adsorption measurement showed that the final alumina has a BET surface area of about 404 m²/g, an average mesopore diameter of 4.5 nm and total pore volume of 0.47 cm³/g.

EXAMPLE 5

This example demonstrates Soxhlet extraction using water as a solvent. First, 200 parts by weight of silica gel, 555 parts of TEA and 418 parts of EG were loaded into a reactor equipped with a condenser. The same procedures were followed as described in Example 3. After about 6 hours, heating was stopped and a slight brown, glue-like liquid was collected after cooling down to room temperature.

Second, 100 parts of water were added into 125 parts of the liquid obtained above under stirring. After one hour stirring, the mixture formed a thick gel; the gel was aged at room temperature for 1 day and afterwards subjected to a hydrothermal treatment in an autoclave at 180° C. for 50 hours.

Third, a small portion of the gel was transferred into a cellulose thimble. The flask of the extraction apparatus was filled with 150 parts of water. The sample was extracted for 9 hours. The extracted material was dried at 120° C. for 2 hours, and calcined at 500° C. for 4 hours with a ramp rate of 2° C./min. The resulting material had a BET surface area of 336 m²/g, a pore volume of 1.15 cm³/g and an average pore diameter of 13.8 nm.

EXAMPLE 6

This example describes the synthesis of mesoporous magnesium oxide. 133 Parts of MgO (99%) was added to a mixture of 557 parts of triethanolamine (99%) and 418 parts of ethylene glycol (anhydrous). The mixture was heated to 190° C., where the mixture turned into a paste. The material was continuously heated for another 1 hour, then cooled down overnight.

Thirty (30) parts of the paste obtained above were mixed with 16.2 parts of water to yield a gel. This gel was aged for 1 day at room temperature. Then it was dried at 98° C. for 12 hours and subjected to a hydrothermal treatment at 180° C. for 1 day. The resulting gel was extracted in a Soxhlet apparatus with ethanol for 9 hours. The resulting material was dried overnight in air, dried at 100° C. for another 2 hours and calcined at 500° C. for 4 hours with heating ramp rate of 2° C./min. The final product showed a BET surface area of 65 m²/g, a total pore volume of 0.44 cm³/g and an average pore diameter of 27.1 nm.

EXAMPLE 7

This example shows the procedures of the pre-calcination under nitrogen to remove the majority of the pore-forming agent. About 514 parts of the paste obtained in Example 5 were mixed with 278 parts of water, and aged for 24 hours at room temperature. The mixture was dried at 98° C. for 24 hours to obtain a dried gel. The dried gel was subjected to a hydrothermal treatment in an autoclave at 180° C. for 4 hours.

Then the dried gel was transferred into a tubular furnace. The pre-calcination was carried out under a nitrogen flow of 300 hr$^{-1}$ and followed a heating program: 3° C./min to 190° C., hold for 1 hour, 3° C./min to 295° C., hold for 2 hours, 5° C./min to 600° C., hold for 1.5 hours. Finally the gas stream was subsequently switched from nitrogen to air by stepwise increasing the percentage of air by 20% every 15 minutes while holding the temperature at 600° C. The temperature was maintained for another 3 hours in pure air, before the oven was cooled down. The resulting material had a BET surface area of 43 m²/g, a total pore volume of 0.24 cm³/g and an average pore diameter of 22.2 nm.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method for making a mesoporous or combined mesoporous/microporous inorganic oxide comprising the steps of:
   a) combining a mixture consisting of a nonaqueous source of an inorganic oxide with an organic complexing and pore-forming ag
   b) reacting the source of inorganic oxide with the complexing and pore-forming agent at a complexation temperature to provide at least one water soluble complex which is thereafter dissolved in water to provide an aqueous mixture, wherein said source of inorganic oxide is an inorganic compound and wherein the complexation temperature ranges from about 150° C. to about 250° C., and wherein a preformed microporous zeolite is added to the aqueous mixture;
   c) decomposing the at least one complex to provide a porous material precursor having a mesoporous inorganic oxide framework containing at least some organic pore-forming agent with the microporous zeolite embedded in said mesoporous inorganic oxide framework; and
   d) removing at least a major portion of the organic pore-forming agent from the inorganic oxide framework by solvent extraction and/or calcination to provide a mesoporous or mesoporous/microporous inorganic oxide characterized by an X-ray diffraction pattern having at least one peak at 0.3 to 3.5 degrees in 2 θ.

2. The method of claim 1 wherein the source of inorganic oxide is selected from unhydrated oxides, hydroxides, nitrates, carbonates, or ammonium salts of at least one metal selected from the group consisting of Si, Al, Ti, V, Cr, Zn, Fe, Sn, Mo, Ga, Ni, Co, Zr, Cu, Mg, Bi, Nb, Mn, Zr, Sb, La, Te, Ce and W.

3. The method of claim 1 wherein the source of inorganic oxide is a silica source, selected from the group consisting of silica gel, silica aerogel, and fumed silica.

4. The method of claim 1 wherein the source of inorganic oxide is aluminum hydroxide or alumina.

5. The method of claim 1 wherein the source of inorganic oxide is selected from the group consisting of magnesium oxide and magnesium hydroxide.

6. The method of claim 1 wherein the step (c) of decomposing the complex comprises hydrolysis of the complex with an acidic, basic or neutral pH aqueous fluid.

7. The method of claim 1 wherein the step (c) of decomposing the complex comprises calcining the complex at a temperature of from about 251° C. to about 400° C.

8. The method of claim 1 wherein the step of removing at least a major portion of the organic pore-forming agent from the inorganic oxide framework is done by solvent extraction comprising immersing the porous material precursor in a solvent selected from the group consisting of water, alcohols, ethers, ketones, esters and combinations thereof.

9. The method of claim 1 further comprising the step of heating the porous material precursor under above atmospheric pressure for a period of time of up to about 4 days.

10. The method of claim 1 wherein said zeolite is selected from the group consisting of zeolite Y, zeolite X, zeolite L, zeolite A, zeolite beta, mordenite, SSZ-32, ZSM-5, ZSM-11, ZSM-22, ZSM-23, ZSM-48, ZSM-58, MCM-22, MCM-36, PSH-3, silicalite-1 and silicalite-2.

11. The method of claim 1 wherein the source of inorganic oxide comprises at least one inorganic oxide of at least one element of one of Groups IVB, VB, VIB, VIIB, III, IB, IIB, IIIB, VIII, VA, IIIA, IVA, IIA and lanthanide of the Periodic Table of the Elements.

12. The method of claim 11 wherein the inorganic oxide comprises at least one oxide of at least one element selected from the group consisting of Si, Al, Ti, V, Cr, Zn, Fe, Sn, Mo, Ga, Ni, Co, Zr, Cu, Mg, Bi, Nb, Mn, Zr, Sb, La, Ce, Te and W.

13. The method of claim 1 wherein the organic complexing and pore-forming agent is an organic compound having amino groups.

14. The method of claim 13 wherein the organic complexing and pore-forming agent is an alkanolamine.

15. The method of claim 14 wherein the alkanolamine is selected from the group consisting of thiethanolamine, tri-isopropanolamine, tripropanolamine, tris-hydroxymethyleneaminomethane, N,N-dimethylethanolamine and combinations thereof.
   b) reacting the source of inorganic oxide with the complexing and pore-forming agent at a complexation temperature to provide at least one water soluble complex which is thereafter dissolved in water to provide an aqueous mixture, wherein said source of inorganic oxide is an inorganic compound and wherein the complexation temperature ranges from about 150° C. to about 250° C., and wherein a preformed microporous zeolite is added to the aqueous mixture;
   c) decomposing the at least one complex to provide a porous material precursor having a mesoporous inorganic oxide framework containing at least some organic pore-forming agent with the microporous zeolite embedded in said mesoporous inorganic oxide framework; and
   d) removing at least a major portion of the organic pore-forming agent from the inorganic oxide framework by solvent extraction and/or calcination to provide a mesoporous or mesoporous/microporous inorganic oxide characterized by an X-ray diffraction pattern having at least one peak at 0.3 to 3.5 degrees in 2θ.

16. The method of claim 1 further comprising the step of aging the porous material precursor at a temperature of from about 20° C. to about 120° C. for a period of time ranging up to about 48 hours.

17. The method of claim 16 further comprising the step of drying the porous material precursor after aging the porous material precursor.

* * * * *

UNITED STATES PATENT AND TRADEMARK OFFICE
CERTIFICATE OF CORRECTION

| | | |
|---|---|---|
| PATENT NO. | : 7,985,400 B2 | Page 1 of 1 |
| APPLICATION NO. | : 10/764797 | |
| DATED | : July 26, 2011 | |
| INVENTOR(S) | : Shan et al. | |

It is certified that error appears in the above-identified patent and that said Letters Patent is hereby corrected as shown below:

Column 9:
Line 10, delete "ag" and insert --agent;--

Column 10:
Lines 28-48, delete

Signed and Sealed this
Eighth Day of November, 2011

David J. Kappos
*Director of the United States Patent and Trademark Office*